US009646062B2

(12) United States Patent
Ormont et al.

(10) Patent No.: US 9,646,062 B2
(45) Date of Patent: *May 9, 2017

(54) NEWS RESULTS THROUGH QUERY EXPANSION

(71) Applicant: Microsoft Corporation, Redmond, WA (US)

(72) Inventors: Justin Ormont, Mountain View, CA (US); Marc Eliot Davis, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,835

(22) Filed: Jun. 10, 2013

(65) Prior Publication Data

US 2014/0365468 A1    Dec. 11, 2014

(51) Int. Cl.
*G06F 17/30* (2006.01)

(52) U.S. Cl.
CPC .. *G06F 17/30554* (2013.01); *G06F 17/30424* (2013.01); *G06F 17/30477* (2013.01); *G06F 17/30699* (2013.01); *G06F 17/30864* (2013.01)

(58) Field of Classification Search
USPC .................... 707/705, 706; 705/14.49, 14.03
See application file for complete search history.

(56) References Cited

U.S. PATENT DOCUMENTS

| 3,919,528 A | 11/1975 | Cooper et al. |
| 5,953,718 A | 9/1999 | Wical |
| 6,038,560 A | 3/2000 | Wical |
| 6,996,572 B1 | 2/2006 | Chakrabarti |
| 7,076,437 B1 | 7/2006 | Levy |
| 7,685,201 B2 | 3/2010 | Zeng et al. |

(Continued)

FOREIGN PATENT DOCUMENTS

GB    2492198 A    12/2012

OTHER PUBLICATIONS

Liu, et al., "Enhancing Collaborative Filtering by User Interest Expansion via Personalized Ranking", Retrieved at <<http://dblab.mgt.ncu.edu.tw/%E6%95%99%E6%9D%90/2012_SNM/77.pdf>>, In IEEE Transactions on Systems, Man, and Cybernetics—Part B: Cybernetics, vol. 42, Issue 1, Feb. 2012, pp. 16.

(Continued)

*Primary Examiner* — Baoquoc N To
(74) *Attorney, Agent, or Firm* — Powell IP Law, PLLC (57) ABSTRACT

Systems and methods for providing improved news results to a news query according to entity expansion are presented. In response to receiving a news query from a computer user, a news engine identifies one or more interest entities of the computer user. Expanded entity data corresponding to the one or more interest entities is obtained, the expanded entity data identifying related entities to the one or more interest entities. The expanded entity data also includes category data corresponding to the categories of the one or more interest entities. Expanded news queries are generated according to the interest entities, the related entities, and category entities corresponding to the categories. News results are obtained according to the expanded news queries and a news presentation is generated and returned to the computer user.

20 Claims, 7 Drawing Sheets

(56) References Cited

U.S. PATENT DOCUMENTS

| | | | |
|---|---|---|---|
| 7,853,552 | B2 | 12/2010 | Beringer et al. |
| 8,112,432 | B2 | 2/2012 | Zhou |
| 8,314,798 | B2 | 11/2012 | Neelakantan et al. |
| 8,326,861 | B1 | 12/2012 | Ainslie |
| 8,346,795 | B2 | 1/2013 | Roulland |
| 2007/0005654 | A1* | 1/2007 | Schachar ............... G06Q 10/00 |
| 2008/0222142 | A1 | 9/2008 | O'Donnell |
| 2008/0306914 | A1* | 12/2008 | Jensen ............................. 707/3 |
| 2009/0094234 | A1 | 4/2009 | Marvit et al. |
| 2009/0144609 | A1 | 6/2009 | Liang |
| 2009/0164431 | A1* | 6/2009 | Zivkovic et al. ................ 707/3 |
| 2010/0094835 | A1 | 4/2010 | Lu et al. |
| 2010/0094846 | A1 | 4/2010 | Rouhani-Kalleh |
| 2010/0145976 | A1 | 6/2010 | Higgins et al. |
| 2011/0047161 | A1 | 2/2011 | Myaeng et al. |
| 2011/0106807 | A1 | 5/2011 | Srihari |
| 2011/0119243 | A1 | 5/2011 | Diamond |
| 2011/0125764 | A1 | 5/2011 | Carmel |
| 2011/0191364 | A1 | 8/2011 | LeBeau et al. |
| 2011/0288939 | A1* | 11/2011 | Elvekrog ........... G06Q 30/0269 705/14.67 |
| 2012/0016642 | A1 | 1/2012 | Li et al. |
| 2012/0192221 | A1 | 7/2012 | McDonough et al. |
| 2012/0225482 | A1* | 9/2012 | Hardiman ............ C07K 14/521 435/375 |
| 2012/0323877 | A1 | 12/2012 | Ray et al. |
| 2013/0060769 | A1 | 3/2013 | Pereg |
| 2013/0173604 | A1 | 7/2013 | Li |
| 2013/0173655 | A1 | 7/2013 | Hoots, III et al. |
| 2013/0226935 | A1 | 8/2013 | Bai et al. |
| 2013/0238594 | A1 | 9/2013 | Hong et al. |
| 2014/0181070 | A1 | 6/2014 | Ormont |
| 2014/0214840 | A1 | 7/2014 | Gupta et al. |
| 2014/0278400 | A1 | 9/2014 | Coussemaeker et al. |
| 2014/0280179 | A1 | 9/2014 | Coleman |
| 2014/0365468 | A1 | 12/2014 | Ormont et al. |

OTHER PUBLICATIONS

Liu, et al., "Personalized News Recommendation Based on Click Behavior", Retrieved at <<http://static.googleusercontent.com/external_content/untrusted_dlcp/research.google.com/ko//pubs/archive/35599.pdf>>, In Proceedings of the 15th International Conference on Intelligent User Interfaces, Feb. 2010, pp. 10.
Abel, et al., "Analyzing User Modeling on Twitter for Personalized News Recommendations", Retrieved at <<http://fabianabel.de/papers/2011-wis-twitter-um-umap.pdf>>, In Proceedings of the 19th International Conference on User Modeling, Adaption and Personalization, Jul. 2011, pp. 12.
Ma, et al., "Interest-Based Personalized Search", Retrieved at <<https://www.csupomona.edu/~zma/research/Interest-Based%20Personalized%20Search.pdf>>, In ACM Transactions on Information Systems, vol. 25, Issue 1, Article 5, Feb. 2007, pp. 38.
"User-centric, Adaptive and Collaborative Information Filtering", Retrieved at <<http://amber.exp.sis.pitt.edu/uacf/>>, Retrieved Date: Jan. 21, 2013, pp. 4.
Liu, et al., "Query Results Ready, Now What?", Retrieved at <<http://sites.computer.org/debull/A10mar/yichen-paper.pdf>>, In IEEE Data Engineering Bulletin, vol. 33, No. 1, Mar. 2010, pp. 8.
"International Search Report & Written Opinion for PCT Application No. PCT/US2014/040970", Mailed Date: Oct. 22, 2014, 12 Pages.
International Search Report & Written Opinion for PCT Application No. PCT/US2014/056853, Mailed Date: Jan. 15, 2015, 11 pages.
International Search Report & Written Opinion for PCT Application No. PCT/US2014/043750, Mailed Date: Oct. 14, 2014, 10 pages.
Micarelli, et al., "Personalized Search on the World Wide Web", Published in Book—The Adaptive web, Lecture Notes in Computer Science vol. 4321, 2007, pp. 195-230.
Liu, Bing, "Sentiment Analysis and Subjectivity", Published in Handbook of Natural Language Processing, Second Edition, 2010, 38 pages.
Li, et al., "Improving Weak Ad-Hoc Queries using Wikipedia as External Corpus", In Proceedings of the 30th annual international ACM SIGIR conference on Research and development in information retrieval, Jul. 23, 2007, pp. 797-798.
Kwok, et al., "Improving Weak Ad-Hoc Retrieval by Web Assistance and Data Fusion", In Proceedings of the Second Asia conference on Asia Information Retrieval Technology, Oct. 13, 2005, pp. 17-30.
Mensink, et al., "Improving People Search Using Query Expansions How Friends Help to Find People", In 10th European Conference on Computer Vision—ECCV,Lecture Notes in Computer Science, vol. 5303, Oct. 12, 2008, pp. 86-99.
Ormont, et al., U.S. Appl. No. 13/931,922, filed Jun. 29, 2013, 25 pages.
Ormont, et al., U.S. Appl. No. 14/039,259, filed Sep. 27, 2013, 34 pages.
Martinez-Romo, et al., "Web People Search Disambiguation using Language Model Techniques", Retrieved at <<http://nlp.uned.es/~lurdes/araujo/weps09.pdf>>, In 18th International World Wide Web Conference, Apr. 20, 2009, 5 pages.
Srinivasan, et al., "Cross Document Person Name Disambiguation Using Entity Profiles", Retrieved at <<http://research.ihost.com/iiweb09/notes/5-P9-iiweb-paper.pdf>>, In Proceedings of the Text Analysis Conference (TAC) Workshop, Nov. 16, 2009, 4 pages.
Kalashnikov, et al., "Disambiguation Algorithm for People Search on the Web", Retrieved at <<http://ieeexplore.ieee.org/stamp/stamp.jsp?tp=&arnumber=4221777>>, In IEEE 23rd International Conference on Data Engineering, Apr. 15, 2007, pp. 1258-1260.
Fonseca et al., "Concept-Based Interactive Query Expansion", Proceedings of the 14th ACM International Conference on Information and Knowledge Management, Oct. 31, 2005, 8 pages.
Nie et al., "Statistical Entity Extraction from Web", Proceedings of the IEEE, vol. 100, Issue 9, Sep. 2009, 12 pages.
Dredze et al., "Entity Disambiguation for Knowledge Base Population", Proceedings of the 23rd International Conference on Computational Linguistics, Aug. 23, 2010, 9 pages.
"Non-final Office Action in U.S. Appl. No. 13/931,922", Mailed Date: Apr. 6, 2015, filed Jun. 29, 2013, pp. 19.
"International Preliminary Report on Patentability Issued in PCT Application No. PCT/US2014/040970", Mailed Date: Aug. 18, 2015, 9 Pages.
"Second Written Opinion Issued in PCT Application No. PCT/US2014/040970", Mailed Date: May 21, 2015, 8 Pages.
"International Preliminary Report on Patentability Issued in PCT Application No. PCT/US2014/043750", Mailed Date: Jul. 31, 2015, 7 Pages.
"Second Written Opinion Issued in PCT Application No. PCT/US2014/043750", Mailed Date: May 7, 2015, 7 Pages.
"International Preliminary Report on Patentability Issued in PCT Patent Application No. PCT/US2014/056853", Mailed Date: Jan. 15, 2016, 9 Pages.
PCT/US2014/056853—International Preliminary Report on Patentability, mailed Jan. 15, 2016, 9 pages.
EP 14737371.6—Rule 161, mailed Jan. 20, 2016, 2 pages.
"Office Action Issued in European Patent Application No. 14737371.6", Mailed Date: Jan. 16, 2017, 9 Pages.

* cited by examiner

NEWS RESULTS THROUGH QUERY EXPANSION

BACKGROUND

When it comes to consuming news, for each person there are those articles that appeal to the person and those articles that do not. News organizations generate and make available news articles covering a broad spectrum of topics for online consumption knowing that, for any one person, only a portion of the news articles will be accessed. For the consumer, identifying interesting articles among the many news articles that are offered by a news organization is time-consuming and inefficient.

In contrast to news organizations that cover a broad spectrum of topics, news aggregators may identify news articles that are relevant to a particular consumer. Generally speaking, the news aggregators attempt to identify news that would be interesting to a particular consumer based on the consumer's preferences (both implicit and explicit preferences) with regard to a particular news article. A consumer expressly indicating an interest to a news aggregator in regard to a news article is an example of express interest in that article. Alternatively, analyzing a consumer's browsing history and identifying a topic that appeals to the consumer is an example of implicit interest. Even relying on a consumer's preferences, it is often difficult to identify news content that is relevant to the consumer.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for providing improved news results to a news query according to entity expansion are presented. In response to receiving a news query from a computer user, a news engine identifies one or more interest entities of the computer user. Expanded entity data corresponding to the one or more interest entities is obtained, where the expanded entity data identifies entities related to the one or more interest entities. The expanded entity data also includes category data corresponding to the categories of the one or more interest entities. Expanded news queries are generated according to the interest entities, the related entities, and category entities corresponding to the categories. News results are obtained according to the expanded news queries and a news presentation is generated and returned to the computer user.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the use of the term "exemplary" in this document should be interpreted as serving as an illustration or example of something, and it should not be interpreted as an ideal and/or a leading illustration of that thing. The term "news" corresponds to information that is generally unknown, likely to be unknown, or presumed unknown to the recipients of the information. News often has a temporal aspect, i.e., newly or recently published information is "news" for a period of time. News includes information regarding people, events, occurrences, developments, topics, and the like. News is not limited to information regarding current events and/or developments, but also includes newly disclosed information regarding past events, topics, developments, etc.

An entity corresponds to an abstract or tangible thing that includes, by way of illustration and not limitation: person, a place, a group, a concept, an activity, and the like. Correspondingly, an interest entity is an entity for which a computer user has, is likely to have, or may have a particular interest. Interest entities may be established by explicit user identification (such as the popular concept of "liking" an entity) or by implicit behaviors. Examining a user's browsing history that indicates repeated navigation and/or interaction (above some predetermined threshold) to one or more locations related to a particular entity may be the basis for an implicitly established interest entity. Alternatively, a user that identifies himself as a member of a social group that demonstrates an interest in a particular activity or cause may be the basis for an implicitly established interest entity (in the activity/cause.) A news query corresponds to a request for news content, typically (but not exclusively) in the form of references to news content. An expanded news query is a news query based on a received news query from a computer user that is expanded to include additional query terms based on interest entities.

Figure 1:
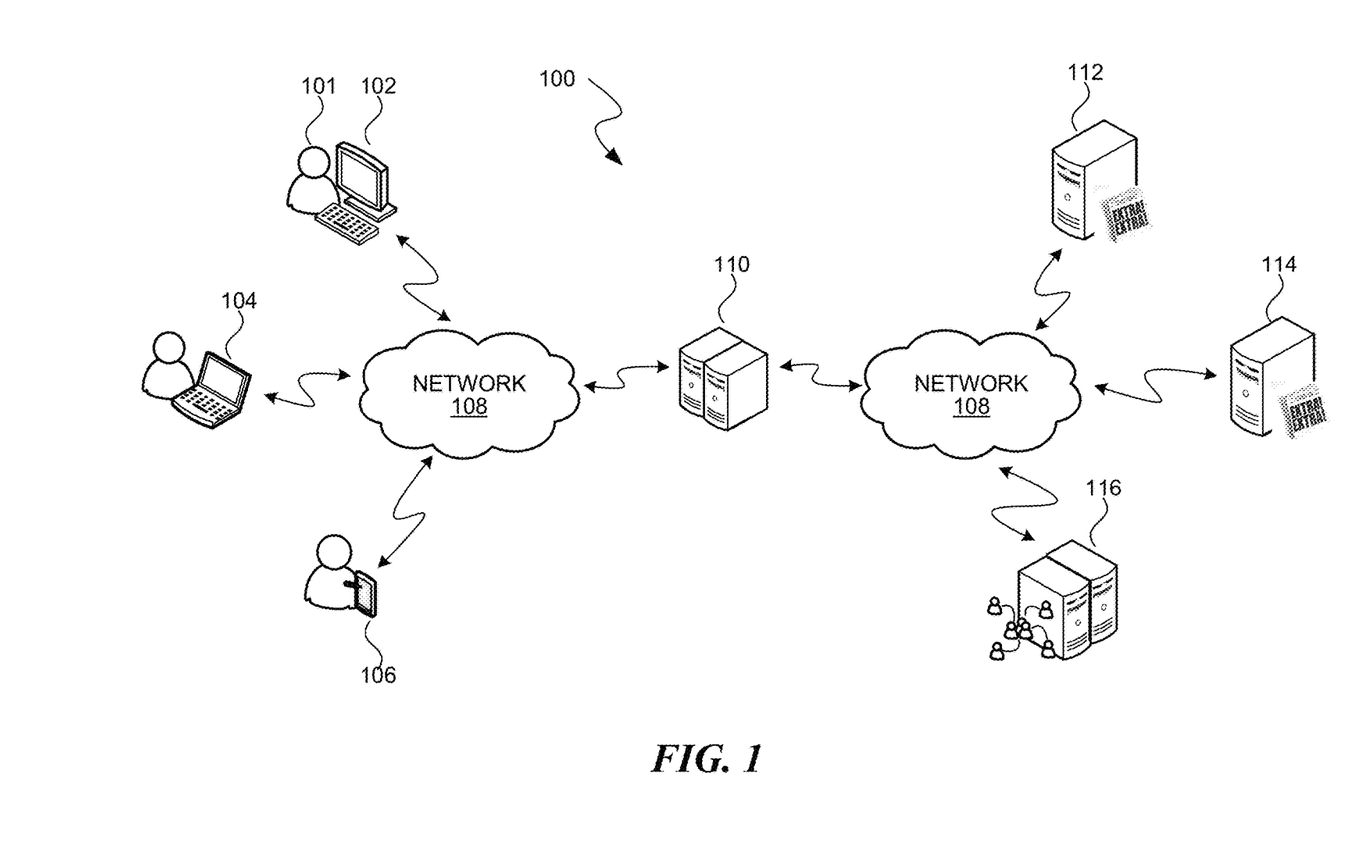
FIG. 1 is a block diagram of a networked environment suitable for implementing aspects of the disclosed subject matter.

Turning to FIG. 1, FIG. 1 is a block diagram illustrating an exemplary networked environment 100 suitable for implementing aspects of the disclosed subject matter, particularly in regard to providing improved news results to a computer user. The exemplary networked environment 100 includes one or more user computers, such as user computers 102-106, connected to a network 108, such as the Internet, a wide area network or WAN, and the like. User computers include, by way of illustration and not limitation: desktop computers (such as desktop computer 104); laptop computers (such as laptop computer 102); tablet computers (such as tablet computer 106); mobile devices (not shown); game consoles (not shown); personal digital assistants (not shown); and the like. User computers may be configured to connect to the network 108 by way of wired and/or wireless connections. For purposes of illustration only, the exemplary networked environment 100 illustrates the network 108 as being located between the user computers 102-106 and the search engine 110, and again between the search engine 110 and the network sites 112-116. This illustration, however, should not be construed as suggesting that these are separate networks.

Also connected to the network 108 are various networked sites, including network sites 110-116. By way of example and not limitation, the networked sites connected to the network 108 include a news engine 110 configured to respond to news queries from computer users, news sources 112 and 114 which host various news articles and content, a social networking site 116, and the like. A computer user, such as computer user 101, may navigate via a user computer, such as user computer 102, to these and other networked sites to access content, including news content.

According to aspects of the disclosed subject matter, the news engine 110 is configured to provide results (typically in the form of references to news content available on the network 108) in response to a news query from a computer user or in response to the computer user visiting (via navigation on the network 108) a news page hosted by the news engine. In particular, in response to receiving a news query from a computer user or in response to a computer user navigating to the news engine's news page, the news engine 110 identifies news content to provide to the computer user, generates a news presentation based on at least some of the identified news content, and provides the news presentation to the computer user.

As mentioned, FIG. 1 also illustratively includes a social network site 116 and various news sources, including news sites 112-114. As will be readily appreciated, a social network site 116 is an online site/service that provides a platform in which a computer user can build relationships and social networks with other computer users, groups, and the like. In a social network site 116, a computer user can share interests, activities, and backgrounds with those in his/her social network. In regard to the social network site 116, those skilled in the art will appreciate that a computer user is often able to indicate a preference or an interest in a particular entity, whether that entity is a person, a place, a group, a concept, an activity, and the like. For example, a computer user 101 may (by way of interaction with the social networking site 116 via a user computer 102 over a network 108) indicate a personal interest and/or preference in one or more television shows (each television show being an entity), such as Revolution. As will be discussed in greater detail below, a computer user's interests or preferences to particular entities may be used to identify interest entities in order to provide improved news results to the computer user.

Though only one social network site 116 is included in the illustrative network environment 100, this should not be viewed as limiting upon the disclosed subject matter. In an actual embodiment, there may be any number of social network sites connected to the network 108. Information regarding the interest entities of a computer user may be obtained from any number of interest entity sources, including multiple social network sites. Indeed, while information regarding a computer user's interest entities may be obtained from social network sites, information regarding a computer user's interest entities may be obtained from other network sources, including but not limited to online shopping sites, blogs, news sites such as news sites 112 and 114, and the like. Further, the news engine 110 may also have information regarding interest entities of the computer user, including interest entities obtained and/or cached from other interest entity sources, entities expressly identified by the computer user, entities implicitly identified according to network browsing history, search queries, purchase history, and the like.

As those skilled in the art will appreciate, news sites 112 and 114 typically host or reference news content relating to various topics. News sites 112 and 114 are generally referred to as news sources. News sites 112 may be the originators of the news content and/or may simply host or reference the news content of other news sources. Of course, news sites 112 and 114 are not limited to sites hosted by traditional news organizations and outlets. Indeed, news engine 110 may be the source of news content and, therefore, be considered a news source. Additionally, blogs, tweets, posts, and the like may all generate news content and, therefore, may also be considered to be news sources.

The news engine 110 is configured to communicate with multiple news sources, including news sites 112 and 114, and obtain information regarding the news content that is available at each news source. This information is stored (typically as references to the content) in a content store such that the news engine can respond to a news query from a computer user, such as computer user 101. The news engine 110 is also suitably configured to communicate (via the network 108) with one or more social network sites, such as social network site 116, to obtain information (also referred to as expanded entity data) including, but not limited to, data identifying interest entities of a computer user, entities that are related to the various interest entities (i.e., related entities), and category data. Category data includes, by way of illustration and not limitation: one or more categories of an interest entity, and category entities that define the potential relationships of the interest entity of a category to other entities. The category entities of a given category act as a type of definition for the category: defining the potential relationships that an entity of the category may have to other entities, though an entity of the category is not required to be related to other entities according to all of the potential relationships of the category. As will be discussed in greater detail below, the related entities have an established relationship to the various interest entities according to relationships defined by the categories of the interest entities. The news engine 110 may obtain both news articles and information identifying a computer user's interest entities from any number of network sites that are able to provide such data to the news engine over the network 108. In this manner, the news engine 110 becomes a source from obtaining news that includes improved results based, at least in part, on interests of the computer user.

Figure 2:
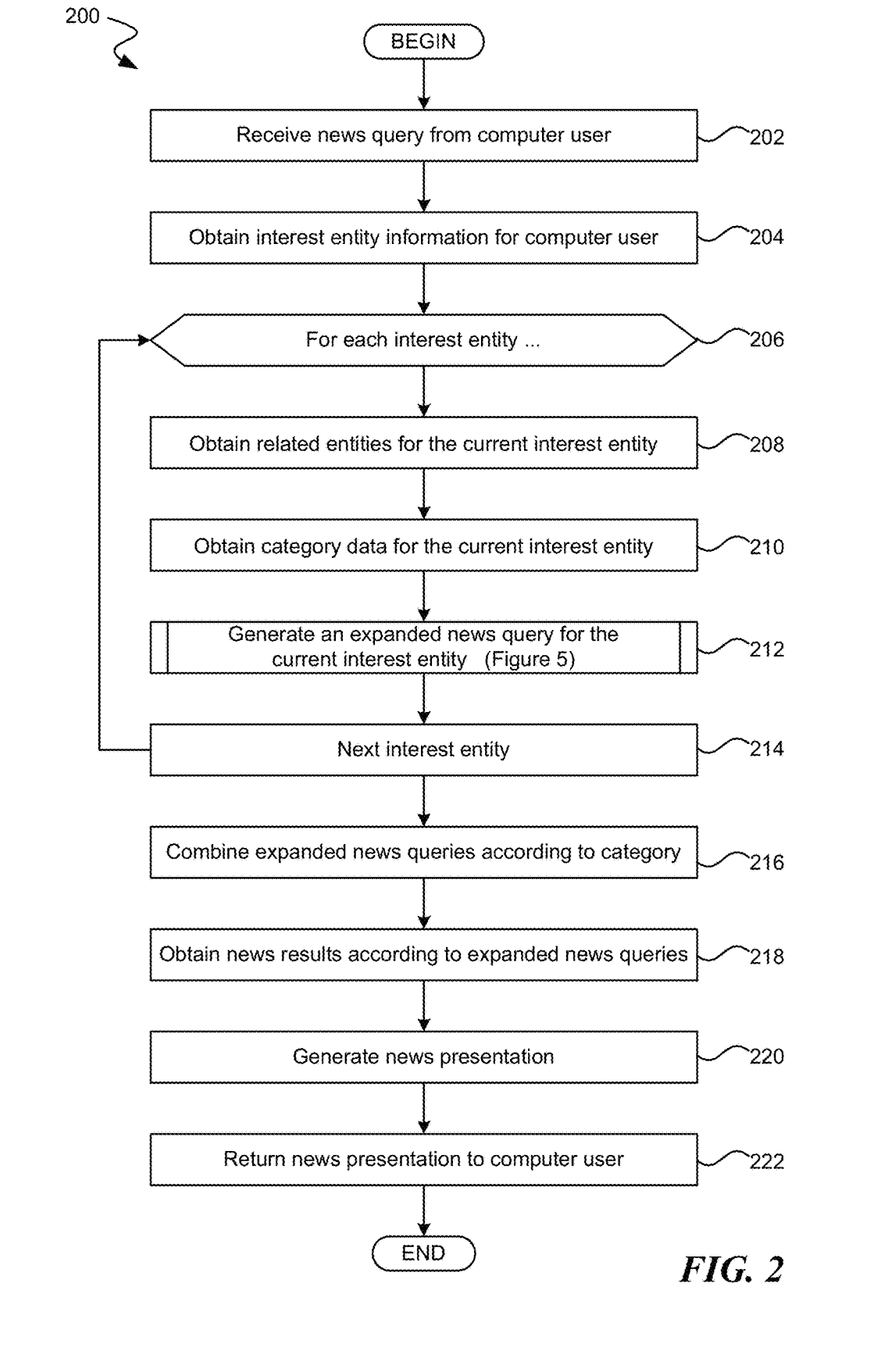
FIG. 2 is a flow diagram illustrating an exemplary routine for providing improved results through query expansion to a news query from a computer user.

To better illustrate how the news engine 110 responds to news queries with improved results, reference is now made to FIG. 2. FIG. 2 is a flow diagram illustrating an exemplary routine 200 for providing improved results through query expansion to a news query from a computer user. Beginning at block 202, the news engine 110 receives a news query from a computer user, such as computer user 101. The news query may be of any number of forms, including but not limited to a general query or request for news from the news engine, a request for news regarding a specific topic, or navigation by the computer user 101 to a news page available on the news engine 110.

At block 204, the news engine 110 obtains interest entity information for the computer user from one or more interest entity sources. An interest entity source is a networked site that has information regarding one or more interest entities of the computer user, including but not limited to the social network site 116, the news sites 112-114, as well as the news engine 110. In the case that the news query is a general news query or resulting from the computer user 101 navigating via a web browser to a news page hosted by the news engine 110, the news engine obtains information regarding all of the interest entities for the computer user from one or more interest entity sources. In the case that the news query specifies a particular topic for which news is sought, the particular topic of the news query may be viewed as an interest entity. The specified topic may be viewed (for purposes of the news query) as the only interest entity of the computer user or, alternatively, one of computer user's interest entities. In either event, the obtained information identifies a set of interest entities of the computer user and each interest entity is associated with a category. As will be described in greater detail below, the category identifies the type or class of interest entity and is used to differentiate and disambiguate between entities of the same name. It should be appreciated that while the news engine 110 may obtain the identity of an interest entity and associated category from a single interest entity source, in various embodiments the identity of the interest entity and the associated category may be obtained from the same source or different sources.

By way of example, assume that the computer user 101 has identified the television show, Revolution, as an interest entity on social network site 116. Moreover, for simplicity purposes, assume that this is the only interest entity of the computer user 101. Hence, the news engine 110, upon receiving the news query from the computer user 101 obtains information regarding interest entities from interest entity sources (including social network site 116), and that obtained information identifies the television show, Revolution, as an interest entity of the computer user 101 and the category for the interest entity is "television show."

At block 206, an iteration loop is begun to iterate through the interest entities identified through block 204. In iterating through the interest entities, each of the interest entities is individually addressed. For description purposes, in the iteration loop the currently addressed interest entity is referred to as the current interest entity.

According to aspects of the disclosed subject matter, in order to obtain improved news results in regarding an interest entity, particularly the current interest entity, news content regarding other entities that are related to the current interest entity should also be considered. More particularly, news content regarding other entities (referred to as related entities) that are related to the current interest entity according to the category of the current interest entity may be considered. Hence, at block 208, the news engine 110 obtains related entity data of the current interest entity, the related entity data identifying related entities to the current interest entity. The news engine 110 obtains related entity data from one or more related entity sources. Often, but not exclusively, related entity data is obtained from the same source as was the interest entity obtained. However, it may be that there are multiple interest entity sources of the current interest entity and the news engine 110 may be configured to obtain related entity data for the current interest entity from each of these sources (i.e., related entity sources.) Further still, according to various embodiments of the disclosed subject matter, the news engine 110 may obtain related entity data from a related entity source that did not provide any information regarding the current interest entity to the news engine.

Continuing the example from above, having obtained interest entity information identifying the television show, Revolution, from the social network site 116, the news engine 110 subsequently obtains related entity data from the same source, i.e., the social network site.

Figure 3:
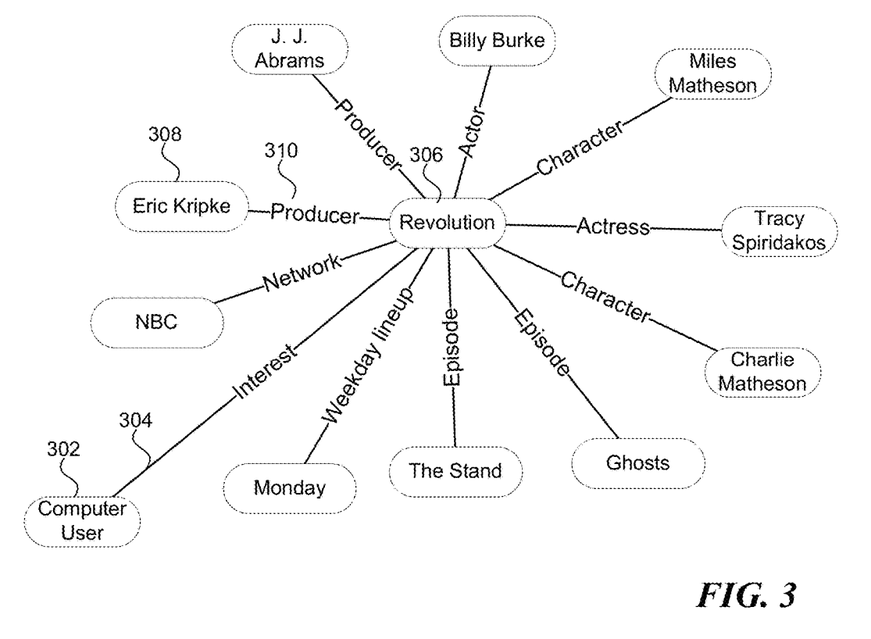
FIGS. 3 and 4 illustrate exemplary entity graphs for describing aspects of the disclosed subject matter.
Figure 4:
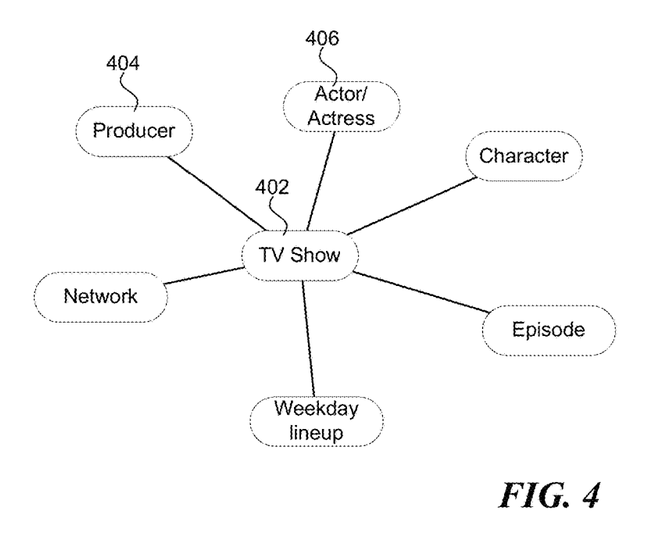

Often, though not exclusively, social network sites maintain an entity graph which, as the name implies, links related entities, where the entities are nodes in the graph and the vertices between the nodes imply a relationship of some nature. FIG. 3 illustrates an exemplary entity graph with regard to the computer user in relation to the example discussed above. As shown in FIG. 3, a computer user node 304 corresponding to the computer user 101 is interested in the television show, Revolution, represented as interest entity node 306. The vertex 306 indicates that the relationship is one of "Interest," hence the interest entity source would identify the interest entity corresponding to interest entity node 306 to the news engine 110 in response to a request for interest entities. Further still, interest entity node 306 (corresponding to the television show, Revolution) is related to various other entities such as producer node 308, corresponding to Eric Kripke who is the producer of the television show, Revolution. Correspondingly, the nature or basis of the relationship between interest entity node 306 and producer node 308 is indicated by vertex 310, i.e., "Producer." As can be seen, interest entity node 306 is related to several other entities based on various relationships based on the category, "television show." According to aspects of the disclosed subject matter, a category not only defines the type or nature of an interest entity, but also is useful for defining the nature or basis of relationships between an entity of the category type and other entities. A category may also be expressed in an entity graph. FIG. 4 illustrates an exemplary entity graph of the category, "television show." As can be seen, a category node 402 corresponding to the category "television show" is related to relationship nodes including producer node 402 and actor/actress node 406.

Regarding categories, it should be appreciated that while a category (such as television show) defines all of the bases of relationships that may exist between an entity of type category and other entities, any given entity is not required to be related to other entities according to all of the bases of relationships. It should be further appreciated that the category defines the bases of relationship between entities according to the category, but each entity may be associated with more than one category and be related to entities according to relationships of different, multiple categories. Hence, a request for related entities from related entity sources will typically imply related entities to an interest entity according to one of many categories associated with the entity.

Returning to FIG. 2, after obtaining related entities of the current interest entity according to the category associated with the current interest entity, at block 210, category data corresponding to the category associated with the current interest entity is obtained. The category data is typically obtained from the related entity sources. In reference to the entity graphs of FIGS. 3 and 4 and continuing the example from above, the related entity data may include the entities of entity graph 300 while the category data may include the entities of entity graph 400.

Figure 5:
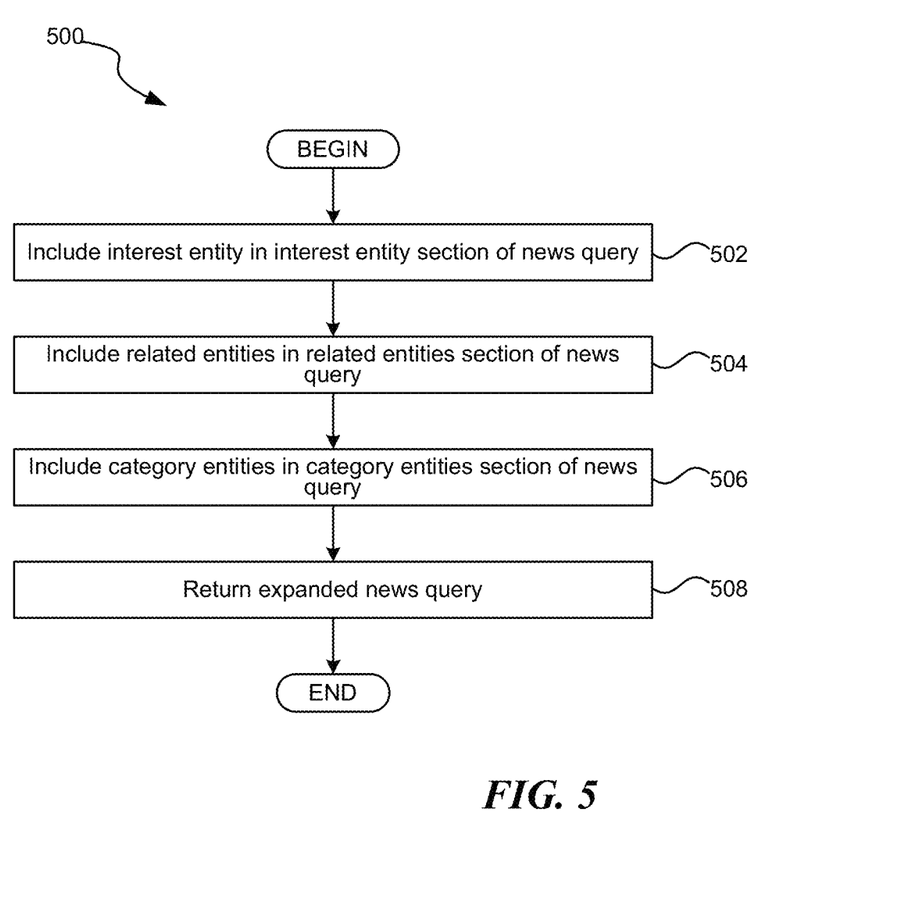
FIG. 5 is a flow diagram illustrating an exemplary routine for generating an expanded news query according to aspects of the disclosed subject matter.

At block 212, with the related entity data and the category data, an expanded news query corresponding to the current interest entity is generated. FIG. 5 illustrates an exemplary routine 500 for generating an expanded news query for the current interest entity in conjunction with the related entity data and the category data. Thus, at block 502, the current interest entity is included in the interest entity section of an expanded news query. At block 504, the related entities (related to the current interest entity according to the category of the current interest entity) are included in a related entities section of the expanded news query. At block 506, the category entities (both the category and relationships) are included in a category entities section of the expanded news query. Thereafter, at block 508, the expanded news query is returned and the routine 500 terminates.

Figure 6:
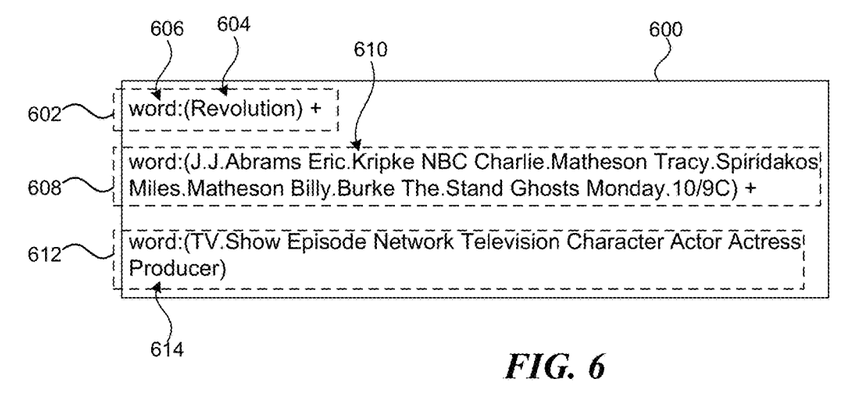
FIGS. 6 and 7 illustrate elements of expanded news queries.

FIG. 6 illustrates an exemplary expanded news query 600 for the interest entity, Revolution. The expanded news query 600 includes the interest entity section 602 that includes the interest entity, as identified by the text 604 "Revolution." Also included in the expanded news query is related entity section 608 that includes the related entities to entity node 306 of entity graph 300, such as text 610 "Eric.Kripke." Still further included in the expanded news query is category entities section 612 that includes the category entities of category "television show" as shown in entity graph 400, including the producer node 404 as indicated by text 614 "Producer." Included in the expanded news query 600 is the token 606 "word:" which corresponds to an exemplary operator to indicate to the news engine 110 to match on any one of the words between the parentheses. On the other hand, according to various embodiments the token 606 "word:" operates as a type of Boolean operator: False or 0 if none of the words or terms between the parenthesis are matched and True or 1 if one or more words or terms between the parenthesis are matched. Alternatively, the "word:" may operate as a "Max" operator: returning the maximum ranking or value of the matched token in the parenthesis. Moreover, the "+" symbol operates as a concatenation of query sections. According to additional embodiments, the "." symbol between two words/terms, such as found in "Erik.Kripke," indicates a preference that the words/terms occur together in the given order, though not required. Of course, other operators may also be included in each of the sections. For example, a "norank:" token (not shown) would require that the specified terms (identified between the following parentheses) be required in a results document but doesn't affect the ordering or relevance of the document in the overall results. Alternatively, a "rankonly:" token (not shown) operates such that the specified terms are not required to be found in a resulting document but, if found, will result in the document being ranked as more relevant to the news query.

It should be appreciated that while each section includes a textual representation of an entity (whether it is the interest entity, a related entity, or a category entity), this is for illustration purposes only and should not be viewed as limiting upon the disclosed subject matter. In various embodiments, tokens and/or identifiers may be used to identify any or all of the various entities included in any section of an expanded news query. According to various embodiments, the identifiers may be the same identifiers used as an index into a news content store (e.g., news content store 926 of FIG. 9). One advantage of using identifiers is that the identifiers can be used to determine alternative spellings, synonyms, and acronyms for a query term. For example, using an identifier may assist the components that retrieve news content to determine that "J J Abrams" is an alternative spelling for "Jeffrey Jacob Abrams". By way of example of including identifiers in the expanded news query, the related entity section of expanded news query 600 may alternative read as:

word:({text:"J J Abrams" id:106190102745711} {text:"Eric Kripke" id:103423983031004} {text:"NBC" id:89742860745} {text:"Charlie Matheson" id:101826386642643} {text:"Tracy Spiridakos" id:178967018811130} {text:"Miles Matheson" id:158755934288892} {text:"Billy Burke" id:38460624317} {text:"The Stand" id:143156049193385} {text:"Ghosts" id:158755934288892} {text:"Monday 10/9C" id:106094562755503})

Of course, the nature of the representations of the entities should conform to the manner in which the news engine 110 can make use of the information. In additional embodiments, in generating the expanded news query, a weighting value may be associated with one or more of the query terms of the expanded news query. Applying these weighting values to query terms assists the one or more components that retrieve news results based on the expanded news query to identify the results that are most relevant to the query and/or likely to satisfy the computer user's query. According to various embodiments, the weighting value operates as a multiplier or factor as to how much the corresponding term will improve the relevancy of the news results. By way of example, a neutral weighting value is 1.0. Any value between 0.0 and 1.0 would lessen the ranking/relevancy value given by that query term. Values greater than 1.0 would provide a greater ranking/relevancy value to the query term. A negative value would lower the total ranking of documents with the corresponding query term; although a query term with a negative weighting value would never be chosen by the word:( )operator to be used as the representative query as it will always be the lowest valued query term. Continuing the example from above, the related entity section 608 of expanded news query 600, with identifiers and weighting values, may alternative read as:

word:({text:"J J Abrams" id:106190102745711 weight:1.8} {text:"Eric Kripke" id:103423983031004 weight:1.8} {text:"NBC" id:89742860745 weight:1.3} {text:"Charlie Matheson" id:101826386642643 weight:1.8} {text:"Tracy Spiridakos" id:178967018811130 weight:1.8} {text:"Miles Matheson" id:158755934288892 weight:1.6} {text:"Billy Burke" id:38460624317 weight:1.6} {text:"The Stand" id:143156049193385 weight:0.7} {text:"Ghosts" id:158755934288892 weight:0.7} {text:"Monday 10/9C" id:106094562755503 weight:0.4})

While not shown, in addition to adding query terms corresponding to entities to the expanded news query that expand the scope of the query, query terms corresponding to "negative entities" may be also added, with the effect of filtering out news results. By way of example, negative entities may be added to the expanded search query by way of a "negativerank:" operator. In retrieving news results for the query, query terms identified by the "negativerank:" operator implies that the terms are not related to the computer user's news query. An example (corresponding to the "Revolution" TV show) may be:

negativerank:word:(Egypt Middle. East Arab.Spring Syria Football Soccer Sports Revolution.Resources New.England.Revolution)

As can be seen, the expanded news query takes a single topic/entity, such as "Revolution," and expands the query with many other entities that are related in some manner to provide a more robust query that can be used to differentiate and disambiguate the sought-for news content from other content that may share a similar name but be entirely unrelated.

Figure 7:
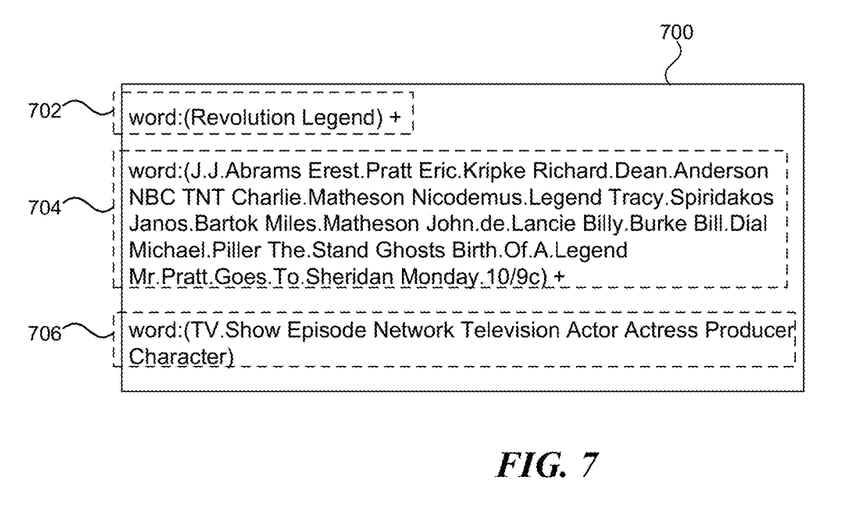

Returning again to FIG. 2, after having generated an expanded news query for the current interest entity, at block 214 the iteration loop returns to block 206 to iterate to the next interest entity if and until there are more to be processed. According to various embodiments, there may be other terminating factors that end the iteration loop. For example it may be that, in the interest of responding to the news query in a timely manner, that the routine iterates only for a predetermined amount of time, or imposes a predetermined limit to the number of interest entities that may be processed. Similarly, related entities may be skipped according to how likely the current interest entity is to obtaining useful results. A combination of the above described factors may also be employed. In any event, when there are no more interest entities to process or when another terminating factor is encountered, the routine 200 proceeds to block 216. At block 216, the expanded news queries generated for the interest entities are combined according to category. Combining expanded news queries according to category entails, for each category, creating a union of the expanded news queries: the union of interest entity sections and related entity sections. Category sections, too, may be combined, especially if category data has been retrieved from different related entity sources. However, where the source of category data is the same for two interest entities of the same category, the category entities will not change. FIG. 7 illustrates an exemplary combined expanded news query 700 in which expanded news queries for the television shows, Revolution and Legend, have been joined. As can be seen, the largest expansion is found in the related entities section 704 (as compared to the expanded news query 600 of FIG. 6.) The interest entities section 702 includes tokens (text) representing both interest entities and the category entity section 706 is unchanged from category entity section 612.

While the above described routines and corresponding figures have identified three distinct sections of an expanded news query, it is illustrative and should not be viewed as limiting upon the disclosed subject matter. In additional embodiments, an expanded news query may include additional categories. For example, an entertainment section (not shown) may be generated into the expanded news query that includes the category entries of TV Shows, as well Movies, Cartoons, Games, and the like. Indeed, as suggested above, categories may be viewed as entities and, as such, be related to other entities and these related categories may be combined in any number of ways to create additional expanded news query sections.

Figure 8:
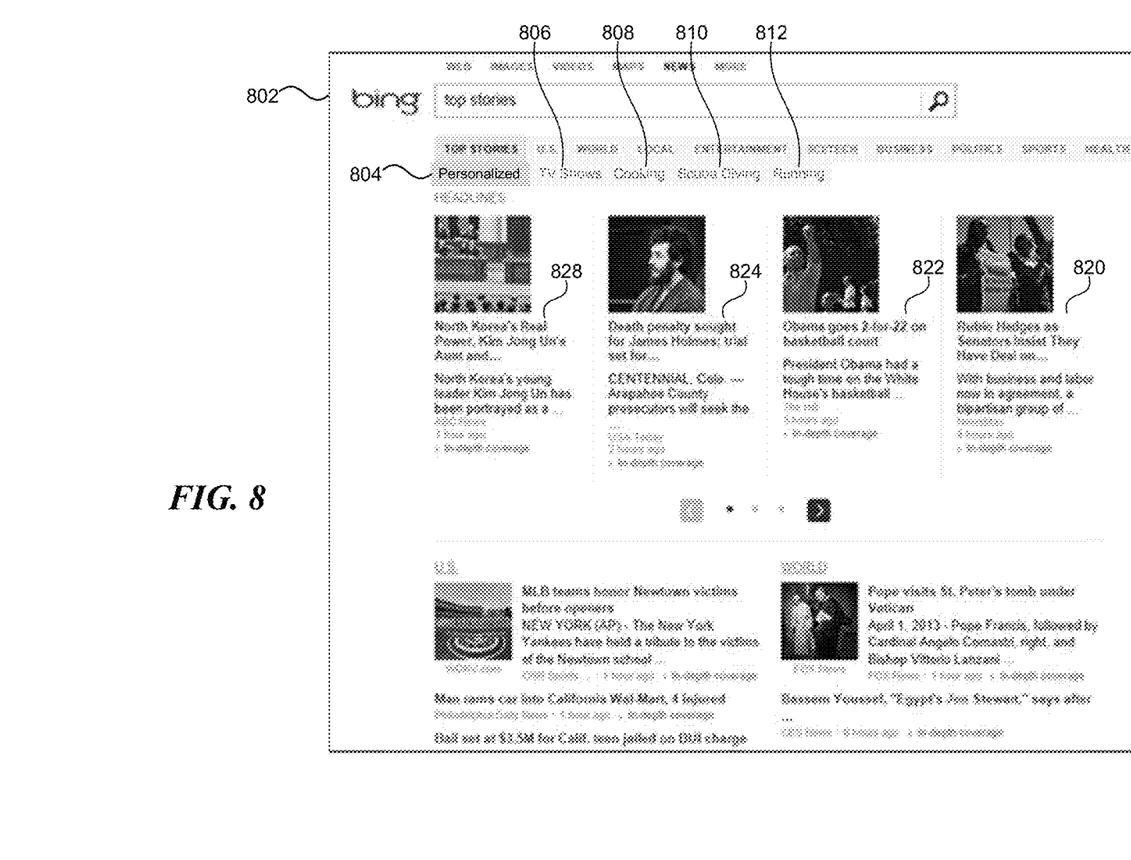
FIG. 8 is pictorial diagram illustrating an exemplary results page having categorized news results.

After generating the combined expanded news queries, at block 218 the news engine 110 obtains news results corresponding to each of the combined expanded news queries. Additional news results may also be obtained, such as general and/or trending news depending on the nature of the news query from the computer user. At block 220, a news presentation is generated. According to aspects of the disclosed subject matter, the news results obtained according to the combined expanded news queries are organized according to category. By way of illustration, FIG. 8 is a pictorial diagram illustrating an exemplary news page 802 having both general news results as well as provisions for viewing news results from combined expanded news queries that are organized according to category. In particular, the news page 802 includes results 820-828 for general/trending news as well as a row 804 of links 806-812 to news results that have been generated according to combined expanded news queries. For example, link 806 to "TV Shows" corresponds to interest entities of the computer user of category "televisions show".

It should be appreciated that the illustrative presentation of news results of FIG. 8 is just one example of a generated news presentation. Indeed, those skilled in the art will appreciate that there are any number presentation formats, which include the results of the combined expanded news queries and may or may not include general news results that may be generated, each according to implementation details. Accordingly, the illustrative example of FIG. 8 should viewed as illustrative and not viewed as limiting upon the disclosed subject matter.

With reference again to FIG. 2, after generating a news presentation, at block 222 the news presentation is returned to the computer user 101 in response to the news query. Thereafter, the routine 200 terminates.

Regarding routine 200, as well as routine 500, while these routines are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 200 and 500 may be carried out in parallel or in series. Often, but not exclusively, the functionality of the various routines is embodied in software (e.g., applications, system services, libraries, and the like) that is executed on computer hardware and/or systems as described below in regard to FIG. 9. In various embodiments, all or some of the various routines may also be embodied in hardware modules, including system on chips, on a computer system.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions stored on the computer-readable storage devices are executed, they carry out various steps, methods and/or functionality, including those steps, methods, and routines described above in regard to routines 200 and 500. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 9:
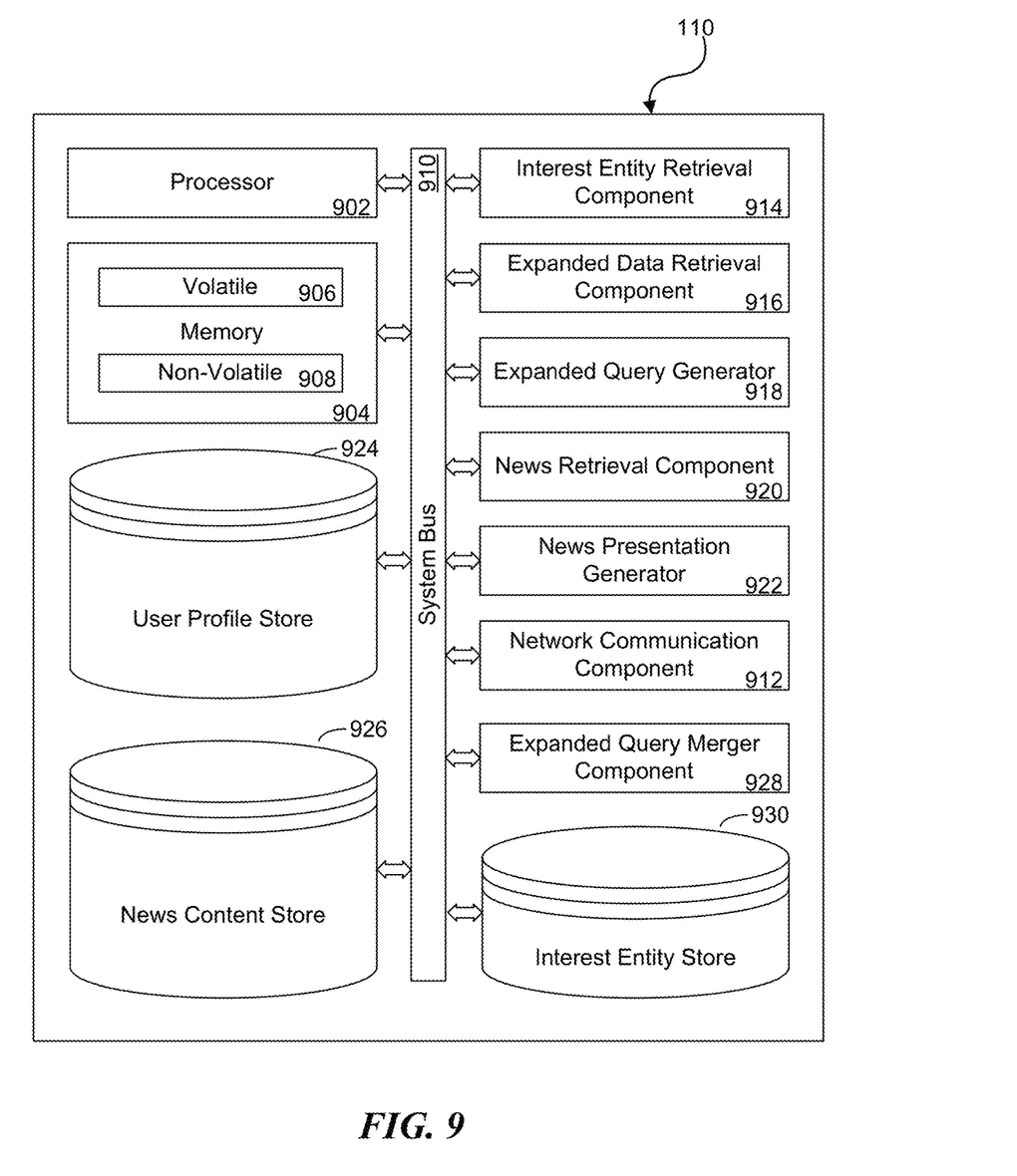
FIG. 9 is a block diagram illustrating exemplary components of a news engine configured to provide improved results in response to a news query from a computer user.

Turning now to FIG. 9, FIG. 9 is a block diagram illustrating exemplary components of a news engine 110 configured to provide improved results in response to a news query from a computer user. As shown in FIG. 9, the news engine 110 includes a processor 902 (or processing unit) and a memory 904 interconnected by way of a system bus 910. As those skilled in the art will appreciated, memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory whereas ROM and memory cards are examples of non-volatile memory.

The processor 902 executes instructions retrieved from the memory 904 in carrying out various functions, particularly in responding to news queries with improved results through query expansion. The processor 902 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); hand-held computing devices such as smartphones, personal digital assistants, and the like; microprocessor-based or programmable consumer electronics; game consoles, and the like.

The system bus 910 provides an interface for the various components to inter-communicate. The system bus 910 can be of any of several types of bus structures that can inter-connect the various components (including both internal and external components). The news engine 110 further includes a network communication component 912 for interconnecting the network site with other computers (including, but not limited to, user computers such as user computers 102-106, other network sites including network sites 112-116) as well as other devices on a computer network 108. The network communication component 912 may be configured to communicate with other devices and services on an external network, such as network 108, via a wired connection, a wireless connection, or both.

The news engine 110 also includes an interest entity retrieval component 914 that is configured to obtain interest entities of the computer user from one or more interest entity sources, as described above. Also included in the news engine 110 is an expanded data retrieval component 916. The expanded data retrieval component 916 obtains related entity data and category data from related entity sources as described above in regard to blocks 208 and 210 of FIG. 2. An expanded query generator 918 generates an expanded query for a current interest entity based on the related entity data and/or the category data obtained by the expanded data retrieval component 916.

An expanded query merger component 928 combines the expanded news queries according to category as described above in regard to block 216 of FIG. 2. With the combined (or merged) expanded news queries, the news engine 110 obtains news results by way of a news retrieval component 920 from a news content store 926. A news presentation generator 922 generates a news presentation for the requesting computer user from the obtained news results, which is provided to the computer user by way of the network communication component 912. Also optionally included in the news engine 110 is a user profile store 924 that, for a plurality of computer users, stores profile information that may include preferences. Moreover, these preferences may identify, directly or indirectly, one or more interest entities of the computer user. As indicated above, while interest entities may be obtained from sources external to the news engine 110, the news engine may also maintain its own interest entity store 930 from which one or more interest entities corresponding to a computer user may be retrieved.

Those skilled in the art will appreciate that the various components of the news engine 110 of FIG. 9 described above may be implemented as executable software modules within the computer systems, as hardware modules (including SoCs—system on a chip), or a combination of the two. Moreover, each of the various components may be implemented as an independent, cooperative process or device, operating in conjunction with one or more computer systems. It should be further appreciated, of course, that the various components described above in regard to the news engine 110 should be viewed as logical components for carrying out the various described functions. As those skilled in the art appreciate, logical components (or subsystems) may or may not correspond directly, in a one-to-one manner, to actual, discrete components. In an actual embodiment, the various components of each computer system may be combined together or broken up across multiple actual components and/or implemented as cooperative processes on a computer network 108.

While various novel aspects of the disclosed subject matter have been described, it should be appreciated that these aspects are exemplary and should not be construed as limiting. Variations and alterations to the various aspects may be made without departing from the scope of the disclosed subject matter. Indeed, while the various novel aspects of the disclosed subject matter have been described in the context of providing improved news results in response to a news query, these same novel aspects may be applied in a broader context to providing improved search results in response to a search query. For example, a news query may be viewed as a specific type of search query—a search query for news (i.e., a query for information regarding recent or current events and/or developments.) In a broader application, upon receiving a search query a search engine may identify one or more interest entities of the requesting computer user (including, but not limited to, the subject matter of the search query), obtain related entity information and category information corresponding to the one or more interest entities, generate expanded queries, combine the expanded queries according to category and execute the combined expanded queries to obtain improved search results.

According to additional, alternative embodiments, aspects of the disclosed subject matter may be advantageously applied to, by way of illustration and not limitation: generating customized printed newspapers and/or magazines (where at least the news presentation is prepared for the targeted presentation media); informational displays/televisions; billboards; head-mounted displays; and the like.

What is claimed:

1. A computer implemented method for providing news to a computer user in response to receiving a news query from the computer user, the method comprising:
  identifying an interest entity of the computer user, wherein the interest entity is associated with a category;
  obtaining expanded entity data corresponding to the interest entity from a related entity source, the expanded entity data comprising related entity data identifying a plurality of related entities that are related to the interest entity;
  generating an expanded news query for news content according to the interest entity and the expanded entity data, wherein generating the expanded news query for news content according to the interest entity and the expanded entity data comprises generating the expanded news query to include a request for the interest entity and the plurality of related entities;
  obtaining a plurality of references to news content according to the news query and the expanded news query, wherein the obtained plurality of references to news content comprise interest entity references to news content related to the interest entity and general references to news content not related to the interest entity;

generating a news presentation according to the obtained references to news content, wherein generating the news presentation according to the obtained references to news content comprises grouping the interest entity references to news content and presenting the interest entity references to news content as being associated with the category of the interest entity; and providing the news presentation to the computer user.

2. The computer implemented method of claim 1, wherein the expanded entity data further comprises category data corresponding to the category associated with the interest entity, wherein the category data comprises category entities identifying all of the bases of relationships that an interest entity associated with the category may have with related entities, each category entity identifying a basis of a relationship that an interest entity associated with the category may have with a related entity.

3. The computer implemented method of claim 2, wherein the bases of the relationships between the interest entity and the plurality of related entities identified in the related entity data is a subset of the bases of relationships between an interest entity associated with the category and related entities as identified by the category data.

4. The computer implemented method of claim 3, wherein generating the expanded news query for news content according to the interest entity and the expanded entity data comprises generating the expanded news query to include a request for the interest entity, the plurality of related entities, and the category entities.

5. The computer implemented method of claim 4, wherein the obtained plurality of references to news content comprise interest entity references to news content related to the interest entity and general references to news content not related to the interest entity; and wherein generating a news presentation according to the obtained references to news content comprises grouping the interest entity references to news content and presenting the interest entity references to news content as being associated with the category of the interest entity.

6. The computer implemented method of claim 4 further comprising:

identifying a plurality of interest entities of the computer user, each of the plurality of interest entities being associated with a category;

obtaining expanded entity data for each of the plurality of interest entities;

generating a plurality of expanded news queries corresponding to each of the plurality of interest entities;

obtaining references to news content for each of the plurality of expanded news queries; and generating a news presentation according to the obtained references to news content, wherein at least a portion of the obtained references to news content is organized according to categories associated with the plurality of interest entites.

7. The computer implemented method of claim 1, wherein obtaining expanded entity data corresponding to the interest entity comprises obtaining the expanded entity data corresponding to the interest entity from a plurality of related entity sources.

8. The computer implemented method of claim 1, wherein subject matter of the expanded news query comprises the interest entity, related entities, and category entities.

9. The computer implemented method of claim 1, wherein the interest entity is identified explicitly or implicitly for the computer user.

10. A computer readable storage medium bearing computer executable instructions which, when executed on a computing system comprising at least a processor executing the instructions retrieved from the medium, carry out a method for providing news to a computer user in response to receiving a news query from the computer user, the method comprising:

identifying a plurality of interest entities of the computer user, each of the plurality of interest entities being associated with a category;

obtaining expanded entity data for each of the plurality of interest entities from a related entity source, the expanded entity data comprising:

related entity data identifying a set of related entities that are related to the interest entity; and category data corresponding to the category associated with the interest entity, the category data comprising a set of category entities identifying all of the bases of relationships that an interest entity associated with the category may have with related entities, each category entity identifying a basis of a relationship that an interest entity associated with the category may have with a related entity;

generating a plurality of expanded news queries corresponding to each of the plurality of interest entities according to the plurality of interest entities and the expanded entity data;

obtaining a plurality of references to news content for each of the plurality of expanded news queries;

generating a news presentation according to the obtained references to news content, wherein at least a portion of the obtained references to news content are organized according to the categories associated with the plurality of interest entities; and providing the news presentation to the computer user.

11. The computer readable storage medium of claim 10, wherein generating the expanded news query for news content according to the interest entity and the expanded entity data comprises generating the expanded news query to include a request for the interest entity, the plurality of related entities, and the category entities.

12. The computer readable storage medium of claim 11, wherein generating a news presentation according to the obtained references to news content comprises grouping a portion of the interest entity references to news content according to the category associated with the interest entity.

13. The computer readable storage medium of claim 10, wherein the method further comprises obtaining expanded entity data corresponding to the interest entity from a plurality of related entity sources.

14. The computer readable storage medium of claim 10, each of the plurality of interest entities is identified explicitly or implicitly for the computer user.

15. A computer system for providing news results in response to receiving a news query from a computer user, the system comprising a processor and a memory, wherein the processor executes instructions stored in the memory as part of or in conjunction with additional components to respond to the news query, the additional components comprising:

an interest entity retrieval component configured to obtain interest entity information identifying a plurality of interest entities of the computer user, each interest entity being associated with a category;

an expanded data retrieval component configured to obtain related entity data identifying related entities for the plurality of interest entities and category data corresponding to the associated categories;

an expanded query generator that generates an expanded news query for each of the plurality of interest entities and corresponding related entity data;

an expanded query merger component that combines the expanded news queries of interest entities of the same category to generate one or more combined expanded news queries;

a news retrieval component configured to obtain references to news content from a news content store according to the one or more combined expanded news queries; and a news presentation generator that generates a news presentation for the computer user according to the obtained references to news content and provides the news presentation to the computer user.

16. The computer system of claim 15, wherein subject matter of the expanded news query comprises the interest entity, related entities, and category entities.

17. The computer system of claim 15, wherein the expanded data retrieval component is configured to obtain related entity data identifying related entities for the plurality of interest entities and category data corresponding to the associated categories from a plurality of related entity sources.

18. The computer system of claim 15, wherein the news presentation generator is configured to generate the news presentation for the computer user according to the obtained references to news content and including a grouping of the interest entity references to news content and present the interest entity references as being associated with the category of the interest entity.

19. The computer system of claim 15, wherein interest entity retrieval component is configured to obtain interest entity information identifying a plurality of interest entities of the computer user, each interest entity being associated with a category, from a plurality of interest entity sources.

20. The computer system of claim 15, wherein each of the plurality of interest entities is identified explicitly or implicitly for the computer user.

* * * * *